United States Patent [19]

Weder et al.

[11] Patent Number: 5,594,048
[45] Date of Patent: Jan. 14, 1997

[54] WATER-BASED INK COMPOSITION FREE OF VOLATILE ORGANIC COMPOUNDS FOR DEPOSITION ON A SUBSTRATE

[75] Inventors: Donald E. Weder; Motiur Rahman, both of Highland, Ill.

[73] Assignee: Southpac Trust International, Inc., Okla. City, Okla.

[21] Appl. No.: 448,950

[22] Filed: May 24, 1995

[51] Int. Cl.$^6$ .............................. C08J 3/03; C09D 11/02
[52] U.S. Cl. ........................ 523/335; 523/160; 523/161; 523/334; 524/502; 106/20 R
[58] Field of Search ..................................... 523/160, 161, 523/334, 335; 106/20 R, 21 E, 20 C; 524/502

[56] References Cited

U.S. PATENT DOCUMENTS

| | | | |
|---|---|---|---|
| 3,950,290 | 4/1976 | Drury, Jr. et al. | 524/276 |
| 3,951,892 | 4/1976 | Drury, Jr. et al. | 106/29 R |
| 4,427,731 | 1/1984 | Gibson | 428/159 |
| 4,471,079 | 9/1984 | Enami | 523/161 |
| 4,695,503 | 9/1987 | Liu et al. | 428/207 |
| 4,960,638 | 10/1990 | Mukoyoshi et al. | 428/195 |
| 5,028,482 | 7/1991 | Jeffs | 428/323 |
| 5,126,010 | 6/1992 | Kobayashi et al. | 162/135 |
| 5,147,706 | 9/1992 | Kingman | 428/195 |
| 5,262,222 | 11/1993 | Kingman | 428/195 |
| 5,281,261 | 1/1994 | Lin | 106/20 R |
| 5,288,160 | 2/1994 | Li et al. | 523/160 |
| 5,320,672 | 6/1994 | Whalen-Shaw | 524/555 |

FOREIGN PATENT DOCUMENTS

| | | |
|---|---|---|
| 0142867 | 5/1985 | European Pat. Off. . |
| 9003412 | 4/1990 | WIPO . |

OTHER PUBLICATIONS

CA 108 (8) 58071p, Shirato, Water–resistant aqueous inks.
CA 93 (16) 151881j, Kojima, Acrylic polymer water–resistant ink.

*Primary Examiner*—Tae Yoon
*Attorney, Agent, or Firm*—Dunlap & Codding, P.C.

[57] ABSTRACT

An article of manufacture comprising a substrate and a water-based ink composition free of volatile organic compounds which is water resistant upon curing. The water-based ink composition contains a water-based particulate pigment dispersion free of volatile organic compounds. Methods for making the water-based particulate dispersions, the water-based inks containing such dispersions and for disposing the water-based pigment dispersion and the water-based ink composition containing such pigment dispersions on a substrate are also disclosed.

1 Claim, No Drawings

5,594,048

WATER-BASED INK COMPOSITION FREE OF VOLATILE ORGANIC COMPOUNDS FOR DEPOSITION ON A SUBSTRATE

FIELD OF THE INVENTION

The present invention relates generally to water-based pigment containing compositions for deposition on substrates, and more particularly but not by way of limitation, to water-based pigment dispersions free of volatile organic compounds. In one aspect, the present invention relates to a method for producing water-based pigment dispersions which are free of volatile organic compounds and the utilization of such water-based pigment dispersions in the formulation of water-based ink compositions wherein particulate pigments are processed to provide stable pigment dispersions in an aqueous media under quiescent conditions.

SUMMARY OF THE INVENTION

According to the present invention, an article of manufacture is provided comprising a substrate selected from a group consisting of cellulose, cellophane, natural fibers, synthetic fibers, metal foils, synthetic organic polymer films and combinations thereof, and water-based pigment containing compositions affixed to at least a portion of the substrate wherein the water-based pigment containing compositions are free of volatile organic compounds and are water-resistant upon curing. The pigment components of the water-based pigment containing compositions are prepared by processing particulate pigments free of volatile organic compounds to provide water dispersable, substantially non-agglomerating pigment products free of volatile organic compounds and admixing an effective amount of such non-agglomerating pigment products with water to provide water-based pigment dispersions free of volatile organic compounds.

Further, according to the present invention, a method for producing water-based particulate pigment dispersions free of volatile organic compounds is provided wherein the water-based particulate pigment dispersions comprise water, an effective amount of a water-based polymeric emulsion, an effective amount of a dispersing agent for preventing particulate pigments dispersed within the water-based polymeric emulsion from agglomerating, and an effective amount of particulate pigments free of volatile organic compounds to provide a desired color to water-based particulate pigment dispersions.

The present invention also provides water-based ink compositions free of volatile organic compounds which, in an uncured condition, comprise water, a water resistance agent having a glass transition point of from about minus 40° C. to about 30° C., an anti-blocking agent having a glass transition point of from about 30° C. to about 100° C., an effective amount of the water-based particulate pigment dispersion free of volatile organic compounds capable of providing color to the composition, a buffer for maintaining a basic pH in the composition, and an effective amount of a viscosity control agent to control the viscosity of the composition.

The water-based ink compositions free of volatile organic compounds of the present invention may also include an effective amount of a foaming agent capable of expanding upon curing of the water-based ink compositions so as to provide foamed water-based ink compositions free of volatile organic solvent.

The present invention also comprises a method of disposing the previously described water based-ink compositions on a substrate selected from a group consisting of cellulose, cellophane, natural fibers, synthetic fibers, metal foils, synthetic organic polymer films and combinations thereof.

DESCRIPTION OF THE PREFERRED EMBODIMENTS

Inks and other pigment containing compositions are useful in a wide variety of applications on various types of substrates. For example, inks may be used to print letters or designs on, or to impart color to, a substrate. The selection of an ink with the appropriate properties is important when the substrate on which the ink is applied is subjected to unusual conditions. Some unusual conditions are the exposure of an ink treated substrate to water-based fluids, exposure of an ink treated substrate to excessive friction for contact with a second substrate, and exposure of an ink treated substrate to ultraviolet radiation.

Numerous attempts have been made to provide water-based compositions, such as water-based ink compositions, having reduced volatile organic compounds (VOC's). Typical of such prior art compositions are the water-based ink compositions disclosed in U.S. Pat. No. 5,262,222 issued Nov. 16, 1993 to Kingman. While the prior art water-based inks are reported to be substantially free of volatile organic compounds, minor amounts of volatile organic compounds have heretofore been required in order to provide a stable dispersion of pigment in the water-based ink compositions. Thus, volatile organic compounds are generated when a substrate on which such ink is applied is burned; and the release of such volatile organic compounds into the atmosphere causes not only pollution, but also ozone depletion. The Environmental Protection Agency has set strict guidelines for the disposal of these types of materials. Therefore, the disposal of products containing the water-based inks of the prior art which contain minor amounts of volatile organic compounds can be costly in terms of money and the environment.

The present invention provides water-based particulate pigment dispersions free of volatile organic compounds which, when incorporated into water-based pigment containing compositions, more particularly water-based ink compositions, produce water-based pigment containing compositions that are free of volatile organic compounds and which are water-resistant upon drying or curing. The water-based particulate pigment dispersions of the present invention are inexpensive to produce and afford a method for processing particulate pigments which are dispersable in an aqueous medium without the use of volatile organic compounds.

The water-based particulate pigment dispersions of the present invention, and the use of such water-based particulate pigment dispersions in the formulation of water-based ink compositions, provide improved quality of color and design placement on selected substrates than either hydrocarbon-based inks, or water-based inks containing minor amounts of volatile organic compounds. Further, upon burning substrates having the water-based compositions of the present invention deposited thereon no volatile organic compounds are produced because such water-based compositions do not contain organic solvents. That is, because of the unique processing of the particulate pigments employed in the formulation of the water-based particulate pigment dispersions of the present invention, such particulate pigments can readily be dispersed in an aqueous medium without the use of volatile organic compounds.

Any substrate on which the water-based compositions containing the water-based particulate pigment dispersions of the present invention can be deposited can be employed in accordance with the present invention. Examples of suitable substrates include cellulose, cellophane, fabric containing natural fibers, fabric containing synthetic fibers, fabric containing blends of natural and synthetic fibers, metal foils, synthetic organic polymer films and combinations thereof.

If water resistance of the substrate is desired, selected substrates not normally water resistant may be treated with a proper agent to resist water. Desirably, the substrate has been treated to be water-resistant, or is inherently water-resistant due to its chemical make-up.

Water-resistant substrate as used herein is to be understood to mean any substrate which has any degree of water resistance.

Water resistance as used herein is to be understood to mean that at least a portion of a water-based fluid will be repelled by the substrate.

Water-resistant ink as used herein is to be understood to mean an ink which, upon drying to a suitable substrate, will not dissolve upon contact with a water-containing item, such as wet cut flowers.

The water-based particulate pigment dispersions free of volatile organic compounds of the present inventions are particularly useful in the formulation of water-based inks which are also free of volatile organic compounds. The water-based particulate pigment dispersions of the present invention comprise water, an effective amount of a water-based polymeric emulsion, an effective amount of a dispersing agent for preventing pigment particles from agglomerating, and an effective amount of particulate pigments to provide the water-based particulate dispersions with a desired color. By processing particulate pigments in accordance with the present invention, the particulate pigments can be rendered water dispersable without the use of volatile organic compounds.

In producing the water-based particulate pigment dispersions of the present invention which are free of volatile organic compounds, particulate pigments (free of volatile organic compounds) are processed in the presence of a dispersing agent to provide water dispersable, substantially non-agglomerating particulate pigment products free of volatile organic compounds. The water dispersable, substantially non-agglomerating particulate pigment products so produced are then admixed with an aqueous medium to provide stable water-based particulate pigment dispersions free of volatile organic compounds in which the processed particulate pigments remain dispersed under quiescent conditions.

Any suitable processing steps can be employed for rendering particulate pigments free of volatile organic compounds in a dispersable, substantially non-agglomerating form. However, desirable results have been obtained wherein the water-based pigment dispersions are prepared by initially forming a substantially homogeneous aqueous emulsion containing a water-based polymeric emulsion and a dispersing agent. Particulate pigments free of volatile organic compounds are then admixed with the substantially homogeneous emulsion and stirred for a period of time effective to distribute the particulate pigments throughout the substantially homogeneous aqueous emulsion. The particulate pigments have a particle size such that under quiescent conditions the particulate pigments tend to settle and separate from the substantially homogeneous aqueous emulsion. Thus, once the particulate pigments substantially free of volatile organic compounds have been substantially uniformly dispersed in the substantially homogeneous aqueous emulsion, the mixing rate is increased for a period of time effective to shear the particulate pigments and provide sheared particulate pigments having a particle size which is dispersable in the substantially homogeneous aqueous emulsion, even under quiescent conditions. That is, the pigment dispersions containing the processed or sheared particulate pigments had a Hegman gauge reading of at least 7.5. The dispersing agent incorporated into the substantially homogeneous aqueous emulsion prevents the sheared particulate pigments from agglomerating so that the sheared particulate pigments remain dispersed in the substantially homogeneous aqueous emulsion under quiescent conditions.

The amount of the water-based polymeric emulsion employed in the processing of the particulate pigments can vary widely. Generally, however, a sufficient amount of the water-based polymeric emulsion will be used to provide from about 0.5 to about 25 weight percent of the water-based polymeric emulsion in the water-based particulate pigment dispersions produced using the processed particulate pigments. The amount of the polymeric constituent present in the water-based polymeric emulsion can also vary widely but will generally be in an amount sufficient to provide the water-based polymeric emulsion with from about 30 to 70 weight percent of the polymeric constituent, and more desirably from about 40 to 60 weight percent.

The water-based polymeric emulsion can be any commercially available product known in the art, such as an aqueous emulsion containing styrene/acrylic polymers. One example of such a water-based polymeric emulsion is Joncryl 62 from S.C. Johnson Wax of Racine, Wis.

The amount of dispersing agent employed in the formulation of the water-based particulate pigment dispersions of the present invention can also vary widely and will be generally dependent on the amount of particulate pigments employed in the water-based particulate pigment dispersions. That is, the amount of dispersing agent employed in the water-based particulate pigment dispersions will be at least that amount required to prevent the processed particulate pigments from agglomerating. Generally, however, desirable results are obtained when the dispersing agent is employed in an amount sufficient to provide from about 0.5 to about 5 weight percent of the dispersing agent in the water-based particulate pigment dispersions.

The dispersing agent employed in the formulation of the water-based particulate pigment dispersions of the present invention can be any dispersing agent compatible with the water-based polymeric emulsion and the particulate pigments and which is capable of preventing agglomeration of the processed particulate pigments. Such dispersing agents are well known in the art. Typical of such dispersing agents is a sodium salt of polymeric carboxylic acid sold under the trade name TAMOL 731N Dispersing Agent by Rohm and Haas Company of Philadelphia, Pa.

The particulate pigments of the water-based ink particulate pigment dispersions of the present invention are substantially water insoluble particulate coloring agents free of volatile organic compounds which are capable of providing a substantially uniform color to water-based compositions, such as the water-based ink compositions hereinafter described, and which have water resistant properties so that the compositions will not run from the substrate once the compositions are dried or cured on the substrate. Examples of commercially available water insoluble particulate pigments which can be used in the practice of the present invention are Phthalo Blue G.S. RX-4962, Zulu Blue NCNF 4863 and Citation Red Light Barium 1058 from Engelhard Corporation Specialty Minerals and Colors Group of Iselin, N.J.; Titanium Dioxide from Mozul Corp; Heuco Red 304910, HeucosperseIII™ Biarylide Yellow HR, Heucosperse III™ Lithol Rubine, Phthalocynanine Blue GS, Drysperse™ β-Phthalocyanine Blue, Lithol Rubine and Drysperse™ Lithol Rubine -Heat Stable from Heucotech Ltd., Fairless Hills, Pa. The amount of particulate pigments employed in the formulation of the water-based particulate pigment dispersions can vary widely. Generally, however, the particulate pigments will be employed in an amount sufficient to provide from about 0.1 to about 70 weight percent of the processed particulate pigments in the water-based particulate dispersions.

As previously stated, water-based ink compositions free of volatile organic compounds can be formulated employing the above-described water-based particulate pigment dispersions wherein the water-based ink compositions comprise, in an uncured condition, water, a water resistance agent having a glass transition point of from about minus 40° C. to about 30° C., an anti-blocking agent having a glass transition point of from about 30° C. to about 100° C., the water-based particulate pigment dispersion free of volatile organic compounds, a buffer for maintaining a basic pH in the ink composition, and a viscosity control agent for controlling the viscosity of the ink composition. By using an anti-blocking agent with a high $T_g$ with a water resistance agent having a relatively lower $T_g$, water resistance and adhesion to hard surfaces such as polyolefin films and foils can be achieved without loss in gloss and clarity of the color, and without the need for a hydrocarbon solvent. $T_g$ as used hereinafter refers to the glass transition point.

The water-based ink compositions free of volatile organic compounds of the present invention have a basic pH of at least 7.5, desirably a pH in the range of from about 8.2 to about 9.5, and more desirably a pH in the range of from about 8.5 to about 9.0. However, it is to be understood that the water-based ink compositions may have any pH which maintains the stability of the system by permitting the water-based ink composition to function as described herein. In one embodiment, an effective amount of ammonia is used to produce the desired pH.

To maintain the pH of the water-based ink compositions in a desired pH range, an effective amount of a buffering agent can be incorporated into the water-based ink compositions. Any suitable buffering agent which is void of volatile organic compounds and which is capable of buffering the water-based ink compositions so as to maintain the pH of such compositions in a desired range can be employed. Such buffering agents are well known in the art. Thus, no further discussion concerning such buffering agents or their use is believed necessary.

The water resistance agent of the water-based ink composition imparts water resistance to the composition, and may also aid the water-based ink composition in adhering to the substrate. Preferably, the water resistance agent has a low $T_g$ such as −40° C. to about 30° C. Water resistance agents which can be employed in the formulation of the water-based ink compositions of the present invention include acrylic and/or styrene/acrylic polymer emulsions such as Lucidene 603 and 606 from Morton Thiokol, Johncryl 74 from S.C. Johnson Wax or Crocryl 600 and 700 from Gropolymer.

The amount of the water resistance agent employed in the formulation of the water-based ink compositions of the present invention can vary widely. Generally, however, the amount of water resistance agent employed will be an amount sufficient to provide from about 5 to about 99 weight percent of the water resistance agent in the water-based ink compositions, preferably from about 20 to about 70 weight percent, and more preferably from about 30 to 60 weight percent.

The anti-blocking agent can be any compound compatible with the water resistance agent and the water-based particulate dispersions and which is capable of preventing the transfer of the ink from a first substrate to which the water-based ink composition is applied to a second substrate which contacts the dried or cured ink. Preferably, the anti-blocking agent has a relatively high $T_g$ such as from about 30° C. to about 100° C. and is a natural film former at low temperatures.

The amount of the anti-blocking agent employed in the formulation of the water-based ink composition of the present invention can vary widely. Generally, however, the amount of anti-blocking agent employed will be an amount sufficient to provide from about 1 to about 85 weight percent of the anti-blocking agent in the water-based ink composition, preferably from about 10 to 70 weight percent, and more preferably from about 10 to about 40 weight percent. Examples of suitable anti-blocking agents which can be used in the formulation of the water-based ink formulations of the present invention are Lucidene 602 from (a styrenated acrylic latex emulsion) and Lucidene 395 (a styrene/acrylic emulsion) from Morton International of Chicago, Ill.

The amount of the water-based particulate pigment dispersion free of volatile organic compounds employed in the formulation of the water-based ink compositions of the present invention can vary widely and will be dependent to a large degree upon the pigment constituents present in the water-based particulate pigment dispersions and the desired color of the water-based ink compositions. Generally, however, the amount of water-based particulate pigment dispersions employed in the formulation of the water-based ink compositions will be an amount sufficient to provide from about 0.1 to about 25 weight percent of the aqueous particulate pigment dispersions in the water-based ink composition, preferably from about 0.1 to about 14 weight percent, and most preferably from about 1.0 to about 8.0 weight percent.

It should be noted that in formulating the water-based particulate pigment dispersions for use in the formulation of the water-based ink compositions of the present invention, any suitable particulate pigment which can be processed to provide the water-based particulate pigment dispersions heretofore described can be employed provided that such pigment constituents are capable of providing uniform color to the water-based ink compositions and possess water resistant properties so that the water-based ink compositions will not run from the substrates once the water-based ink compositions have dried on the substrates.

Other agents may be added to the water-based ink compositions of the present invention in a sufficient amount in order to facilitate application of the water-based ink compositions to substrates. A buffering agent may be added in a sufficient amount in order to keep the solution basic. When employing a buffering agent, the amount of buffering agent employed in the formulation of the water-based ink compositions will be an amount sufficient to provide from about 0.1 to 5, more preferably from 1.0 to 4, and most preferably from about 2 to 3 weight percent of the buffering agent in the water-based ink composition. Buffering agents are well known in the art and any buffering agent capable of maintaining the pH of the water-based ink compositions in the desired pH range can be employed provided such buffering agents are void of volatile organic compounds.

A stabilization agent may also be added to the water-based ink composition of the present invention in a sufficient amount to enhance the ability of the ink to remain in the solution and prevent premature drying of the ink before being applied to the substrate. Any suitable stabilization agent can be employed. An example of such a stabilization agent is acrylic polymers such as Morez 100 (a styrene/acrylic resin) from Morton Industrial of Chicago, Ill. The stabilization agent is preferably present in the water-based ink composition in an amount of from about 0.1 to 10 weight percent, more preferably from 1.0 to 3 weight percent, and most preferably from 2.5 to 3 weight percent.

A wax agent may be added to the water-based ink compositions of the present invention in a sufficient amount to help with rub off. "Rub off" means the ink coming off from substrate after drying. Any type of wax compatible with the water-based ink compositions of the present invention may be used, such as Polyethylene Wax Emulsion from Zinchem and Liquitron from Carroll Scientific, Inc. of Countryside, Ill. The wax agent is present in the water-based compositions of the present invention in an amount of from 0.1 to 15 weight percent, more preferably from about 3 to 12 weight percent, and most preferably from about 9 to 11 weight percent.

Additionally, a surface active agent may be added to the water-based ink compositions of the present invention in a sufficient amount in order to improve lay down of the inks. By improving the "lay down of the ink", the cured surface of the ink is smooth, not grainy, to the touch. Although any surface active agent which improves the lay down of the inks and which is void of volatile organic compounds may be used, preferably the surface active agent is a surfactant which is sufficiently water resistant or not water soluble in order to prevent the running of the surfactant from the ink when contacted by water on the substrate. Examples of acceptable surfactants utilized as the surface active agent in the water-based ink compositions of the present invention are Surfynol® 104 surfactant (2,4,7,9-tetramethyl- 5-decyne-4,7-diol) and Surfynol® SE-F surfactant (ethoxylated 2,4,7,9-tetramethyl-5-decyne-4,7-diol blend) from Air Products. The surfactant is present in the water-based ink compositions in an amount of from about 0.1 to 6 weight percent, and more preferably about 1 to 5 weight percent, and most preferably from 1 to 6 weight percent.

A slip agent may be added to the composition of the present invention in an effective amount to enhance the reduction in friction ("slip") between substrates such as rolls or sheets of material. One example of a slip agent compatible with the composition of the present invention is No-Stik 812 from Ross Chemical Company (Polydimethylsiloxane emulsion). The slip agent is present in the water-based ink compositions of the present invention in an amount of from about 0.5 to 2 weight percent, and more preferably from about 0.1 to 0.5 weight percent, and most preferably from about 0.1 to 0.5 weight percent.

A defoaming agent may be added to the water-based ink compositions of the present invention in an effective amount to control any foam present in the compositions which might interfere with the application of the ink to the substrate. The amount of the defoaming agent incorporated into the water-based ink compositions of the present invention can vary widely. Generally, however, the defoaming agent is incorporated into the water-based ink compositions in an amount sufficient to provide from about 0.01 to about 0.5 weight percent of the defoaming agent in the water-based ink compositions, and more preferably about 0.05 to about 0.3 weigh percent.

Certain types of defoaming agents which cause "fish eye" or "orange peel effect" should not be used with the composition of the present invention. "Fish eye" is a term used in applying an ink design to a substrate where a portion of the design is not affixed to the substrate. These void areas often have the configuration of a fish eye. "Orange peel effect" is a term used to denote a rough surface provided by the ink. Some silicone defoamers may produce fish eye and/or orange peel effects when used with the present invention. An example of a suitable defoamer which is compatible with the water-based ink compositions of the present invention and which does not cause a "fish eye" or an "orange peel effect" is Byk-035 from Byk Chemie Company.

A viscosity control agent may be added to the composition of the present invention. A preferred viscosity control agent is water. The amount of water used with the water-based ink compositions of the present invention will depend upon the desired viscosity of the water-based ink compositions.

A blowing agent may also be incorporated into the water-based ink compositions of the present invention when one desires to produce three-dimensional patterns on the substrate. The amount of blowing agent incorporated into the water-based ink compositions can vary widely and will generally be dependent upon the overall density and appearance desired in the three-dimensional patterns produced by the deposition of the water-based ink compositions containing the blowing agent on the substrate.

Any blowing agent can be incorporated into the water-based ink compositions of the present invention provided the blowing agent is compatible with the constituents of the water-based ink compositions and is capable of expanding during the drying or curing of the substrate after the water-based ink compositions have been deposited thereon. An example of a suitable blowing agent is Expancel® microspheres from Expancel Inc. of Duluth, Ga.

The water-based ink compositions of the present invention may be applied to the substrate in any appropriate manner. The method of application may be manual or mechanical. If the substrate forms sheets or an elongated sheet which may form a roll, then gravure, flexographic procedures, or Mayer rod procedures may be used.

The substrate may be formed into any article of manufacture. Some examples of "articles of manufacture" are flower pot covers as described in U.S. Pat. No. 4,773,182 issued to Weder et al. on Sep. 27, 1988 entitled ARTICLE FORMING SYSTEM, hereby incorporated herein, and sheets or rolls of wrapping material for gifts or floral groupings.

EXAMPLE I

A water-based particulate pigment dispersion free of volatile organic compounds is prepared in accordance with the following procedure.

57.5 pounds of water is introduced into a clean container equipped with a mixer. Mixing of the water in the container is initiated and 6 pounds of Joncryl 62 (a styrene/acrylic polymeric emulsion from S.E. Johnson Wax) and 1.5 pounds of Tamol 731N dispersing agent (a sodium salt of polymeric carboxylic acid from Rohm & Hass Company) are slowly added to the water in the container and admixed to form a substantially homogeneous aqueous emulsion. 35 pounds of Phthalo Blue G.S. RX-4962 pigment (a particulate pigment free of volatile organic compounds from Engelhard Corp., Specialty Minerals and Colors Group, Iselin, N.J.) is introduced into the homogeneous aqueous emulsion and the resulting admixture mixed for a period of time effective to disperse the particulate pigment in the substantially homogeneous aqueous emulsion. Thereafter, the mixing speed was increased to a sufficient rate to shear the particulate pigment dispersed in the substantially homogeneous aqueous emulsion. Mixing at the increased rate is continued until a water-based particulate pigment dispersion is formed having a Hegman Gauge reading of at least about 7.5. When the aqueous dispersion reaches the desired Hegman Gauge reading, a stable, water-based particulate pigment dispersion free of volatile organic compounds is produced. Further, the particulate pigment remains dispersed under quiescent conditions.

EXAMPLE II

A water-based particulate pigment dispersion free of volatile organic compounds is prepared in accordance with the following procedure.

57.5 pounds of water is introduced into a clean container equipped with a mixer. Mixing of the water in the container is initiated and 6 pounds of Joncryl 62 (a styrene/acrylic polymeric emulsion from S.E. Johnson Wax) and 1.5 pounds of Tamol 731N dispersing agent (a sodium salt of polymeric carboxylic acid from Rohm & Haas Company) are slowly added to the water in the container and admixed to form a substantially homogeneous aqueous emulsion. 35 pounds of Citation Red Light Barium 1058 pigment (a particulate pigment free of volatile organic compounds from Engelhard Corp., Specialty Minerals and Colors Group, Iselin, N.J.) is introduced into the homogeneous aqueous emulsion and the resulting admixture mixed for a period of time effective to disperse the particulate pigment in the substantially homogeneous aqueous emulsion. Thereafter, the mixing speed was increased to a sufficient rate to shear the particulate pigment dispersed in the substantially homogeneous aqueous emulsion. Mixing at the increased rate is continued until a water-based particulate pigment dispersion is formed having a Hegman Gauge reading of at least about 7.5. When the aqueous dispersion reaches the desired Hegman Gauge reading, a stable, water-based particulate pigment dispersion free of volatile organic compounds is produced. Further, the particulate pigment remains dispersed under quiescent conditions.

EXAMPLE III

A water-based particulate pigment dispersion free of volatile organic compounds is prepared in accordance with the following procedure.

29.5 pounds of water is introduced into a clean container equipped with a mixer. Mixing of the water in the container is initiated and 0.3 pounds of Aqua Ammonia 26' Be., 1.0 pound of Alcogum L-11 ( an acrylic emulsion copolymer from Alco Chemical of Chattanooga, Tenn.) and 0.9 pounds of Tamol 731N dispersing agent (a sodium salt of polymeric carboxylic acid from Rohm & Haas Company) are slowly added to the water in the container and admixed to form a substantially homogeneous aqueous emulsion. To retard generation of foam in the substantially homogeneous aqueous emulsion, 0.5 pounds of Defoamer BYK-035 (a fatty acid ester defoamer from BYK Chemie) is introduced into the substantially homogeneous aqueous emulsion while mixing. 64 pounds of Titanium Dioxide CR-800 particulate pigment free of volatile organic compounds is introduced in increments into the homogeneous aqueous emulsion and, after the addition of the Titanium Dioxide Cr-800 particulate pigment, the resulting admixture mixed for about 10 minutes to disperse the particulate pigment in the substantially homogeneous aqueous emulsion. Thereafter, 2.4 pounds of Joncryl 62 (a styrene/acrylic polymeric emulsion from S.E. Johnson Wax) and 1.4 pounds of Surfynol 420 (a surfactant from Air Products and Chemicals, Inc. of Allentown, Pa.) are introduced into the resulting admixture containing the particulate pigment and mixing is then continued at a mixing rate sufficient to shear the particulate pigment dispersed in the substantially homogeneous aqueous emulsion. Mixing at the increased rate is continued until a water-based particulate pigment dispersion is formed having a Hegman Gauge reading of at least about 7.5. When the aqueous dispersion reaches the desired Hegman Gauge reading, a stable, water-based particulate pigment dispersion free of volatile organic compounds is produced. Further, the particulate pigment remains dispersed under quiescent conditions.

EXAMPLE IV

Water-based inks containing the stable, particulate pigment dispersions of Examples I–III are prepared in accordance with the following procedure.

2,620 pounds of Lucidene 603 (a styrene/acrylic polymer emulsion from Morton International, Chicago, Ill.) and 1,106 pounds of Lucidene 395 (a styrene/acrylic emulsion also from Morton International, Chicago, Ill.) are admixed in a mixing vessel equipped with a mixer. The mixer is activated and 52 pounds of Surfynol®465 surfactant (a mixture of ethoxylated acetylenic diols from Air Products & Chemicals, Inc., Allentown, Pa.), 72 pounds of No-Stik 20-021-01 slip agent (a polydimethylsiloxane emulsion from Ross Chem, Inc. of Fountain Inn, S.C.), 80 pounds of Liquitron 440™ (a polyethylene dispersion from Carroll Scientific, Inc. of Countryside, Ill.) and 60 pounds of Aqua Ammonia 26' Be from G.S. Robins & Company, St. Louis, Mo.) are then introduced into the mixing tank and admixed with the Lucidene 603 and Lucidene 395 polymeric emulsions for about 20 minutes to provide a water-based lacquer.

To produce a water-based ink composition containing the stable, water dispersable particulate pigments of Examples I–III, a mixer is placed on a 55 gallon epoxy lined drum. 68.5 pounds of lacquer and 36.5 pounds of the pigment dispersion of Example I are placed in the drum and the mixer is turned on to a low rpm to mix the pigments until smooth and consistent. While still mixing, 6.5 pounds of water are added and mixed. The mixer is turned to 1,000 rpm for approximately 10 minutes and the viscosity of the water-based ink composition so produced is adjusted to 11–13 second #3 Zahn Cup.

The mixer is removed and a pump is attached to the drum. The water-based ink composition is pumped into a stainless steel pan and constantly recirculated back to the drum. The water-based ink composition is applied by Rotogravure using a 300 Line Ceramic knurl to 65 gauge (0.0065-41) virgin foil at speeds of from about 300 to about 700 fpm.

The color treated foil produced by the application of the water-based ink compositions to virgin foil may be formed into a flower pot cover using the method described in U.S.

Pat. No. 4,773,182 issued Sep. 27, 1988 to Weder et al. entitled ARTICLE FORMING SYSTEM.

Changes may be made in the embodiments of the invention described herein, or in parts or elements of the embodiments described herein, or in the sequence of steps of the methods described herein, without departing from the spirit and/or scope of the invention as defined in the following claims.

What is claimed:

1. A method for producing a water-based ink composition free of volatile organic compounds for deposition on a substrate selected from a group consisting of cellulose, cellophane, natural fibers, synthetic fibers, metal foils, synthetic organic polymer films and combinations thereof to produce three-dimensional patterns on the substrate, the method comprising the steps of:

admixing a blowing agent, a water-based pigment dispersion free of volatile organic compounds and a water-based composition free of volatile organic compounds to provide a foamed water-based ink composition free of volatile organic compounds wherein the blowing agent is present in an amount sufficient to foam the water-based ink composition and produce a three-dimensional pattern on curing, the water-based pigment dispersion having a Hegman gauge reading of at least about 7.5 and being present in an amount sufficient to provide the water-based ink composition with a predetermined color, the water-based ink in an uncured condition comprising:

from about 5 to about 98.9 weight percent of a water resistance agent having a glass transition point of from about minus 40 C. to about 30 C.;

from about 1 to about 85 weight percent of an anti-blocking agent having a glass transition point of from about 30 C. to about 100 C.;

an effective amount of the blowing agent to foam the water-based ink composition and produce a three-dimensional pattern on curing; and from about 0.1 to about 25 weight percent of a water-based pigment dispersion free of volatile organic compounds and having a Hegman gauge reading of at least about 7.5 wherein the water-based pigment dispersion is formed by the steps of:

admixing a substantially homogeneous aqueous emulsion and a particulate pigment free of volatile organic compounds to disperse the particulate pigment in the homogeneous aqueous emulsion;

shearing the particulate pigment dispersed in the substantially homogeneous emulsion to reduce the particle size of the particulate pigment and provide the water-based pigment dispersion free of volatile organic compounds having a Hegman gauge reading of at least about 7.5 whereby the sheared particulate pigment remains dispersed in the homogenous emulsion under quiescent conditions, the water-based pigment dispersion having a Hegman gauge reading of at least about 7.5 comprising, in an uncured state:

water;

from about 5 to about 25 weight percent of the water-based polymeric acrylic emulsion compatible with the dispersing agent and the particulate pigment;

from about 0.5 to about 5 weight percent of the dispersing agent capable of preventing agglomeration of the sheared particulate pigment; and from about 15 to about 70 weight percent of the sheared particulate pigment.

* * * * *